US012734998B2

(12) United States Patent
Gustavsson

(10) Patent No.: US 12,734,998 B2
(45) Date of Patent: Sep. 15, 2026

(54) DETERMINING A LENS COVERAGE CONDITION OF A LIGHT-BASED SCANNING DEVICE ARRANGED IN A VEHICLE

(71) Applicant: Volvo Autonomous Solutions AB, Gothenburg (SE)

(72) Inventor: Viktor Gustavsson, Västerås (SE)

(73) Assignee: Volvo Autonomous Solutions AB, Gothenburg (SE)

( * ) Notice: Subject to any disclaimer, the term of this patent is extended or adjusted under 35 U.S.C. 154(b) by 26 days.

(21) Appl. No.: 18/934,611

(22) Filed: Nov. 1, 2024

(65) Prior Publication Data

US 2025/0178568 A1 Jun. 5, 2025

(30) Foreign Application Priority Data

Dec. 1, 2023 (EP) .................................... 23213580

(51) Int. Cl.
*B60S 1/56* (2006.01)
*B60Q 9/00* (2006.01)
(Continued)

(52) U.S. Cl.
CPC .................. *B60S 1/56* (2013.01); *B60Q 9/00* (2013.01); *B60T 7/12* (2013.01); *B60T 8/171* (2013.01); *B60T 8/172* (2013.01); *B60T 8/58* (2013.01); *E02F 9/2033* (2013.01); *E02F 9/2083* (2013.01); *E02F 9/24* (2013.01);
(Continued)

(58) Field of Classification Search
CPC ..... B60S 1/56; B60Q 9/00; B60T 7/12; B60T 8/171; B60T 8/172; B60T 8/58; B60T 2210/30; B60T 2250/02; B60T 2250/04; B60T 2260/00; E02F 9/2033;
(Continued)

(56) References Cited

U.S. PATENT DOCUMENTS 9,274,525 B1 3/2016 Ferguson et al.
10,496,104 B1 * 12/2019 Liu .......................... G06T 5/73
(Continued)

FOREIGN PATENT DOCUMENTS

CN 112970029 A 6/2021
EP 3637143 A1 4/2020
(Continued)

OTHER PUBLICATIONS

Extended European Search Report for European Patent Application No. 23213580.6, dated May 31, 2024, 9 pages.

*Primary Examiner* — Andrew R Dyer
(74) *Attorney, Agent, or Firm* — Sage Patent Group

(57) ABSTRACT

A computer system including processing circuitry configured to obtain light data from a light-based scanning device; obtain trajectory data of an upcoming trajectory of a vehicle; generate a frame of reference for the light-based scanning device, the frame of reference indicating positional relationships of a plurality of light points based on the light data and a plurality of trajectory points based on the trajectory data; for one or more given trajectory points, identify a non-overlapping region in the frame of reference where no light points are collocated at the one or more given trajectory points; and determine the lens coverage condition based on a position of the vehicle in relation to the identified non-overlapping region.

18 Claims, 7 Drawing Sheets

(51) Int. Cl.

| | |
|---|---|
| ***B60T 7/12*** | (2006.01) |
| ***B60T 8/171*** | (2006.01) |
| ***B60T 8/172*** | (2006.01) |
| ***B60T 8/58*** | (2006.01) |
| ***E02F 9/20*** | (2006.01) |
| ***E02F 9/24*** | (2006.01) |
| ***E02F 9/26*** | (2006.01) |
| ***G01S 7/497*** | (2006.01) |
| ***G01S 17/931*** | (2020.01) |

(52) U.S. Cl.
CPC .............. *E02F 9/261* (2013.01); *E02F 9/268* (2013.01); *G01S 7/497* (2013.01); *G01S 17/931* (2020.01); *B60T 2210/30* (2013.01); *B60T 2250/02* (2013.01); *B60T 2250/04* (2013.01); *B60T 2260/00* (2013.01); *G01S 2007/4975* (2013.01)

(58) Field of Classification Search
CPC . E02F 9/2083; E02F 9/24; E02F 9/261; E02F 9/268; G01S 7/497; G01S 17/931; G01S 2007/4975
USPC ............................................................ 701/25
See application file for complete search history.

(56) References Cited

U.S. PATENT DOCUMENTS 11,040,619 B1 * 6/2021 Martin .................. B60R 16/037
11,143,514 B2 10/2021 Bai et al.
11,167,751 B2 11/2021 Liu et al.
11,655,893 B1 * 5/2023 Pertsel ................... G06V 10/95 701/59
12,235,396 B1 * 2/2025 Terefe ....................... B60S 1/54
2016/0282874 A1 9/2016 Kurata et al.
2017/0036647 A1 * 2/2017 Zhao ......................... B08B 3/02
2018/0134259 A1 * 5/2018 Wachter ............. G02B 27/0006
2019/0106085 A1 * 4/2019 Bacchus ............ G02B 27/0006
2019/0291740 A1 * 9/2019 Higashitani ............. G01S 17/86
2019/0322245 A1 * 10/2019 Kline .................... B60S 1/0848
2019/0329782 A1 * 10/2019 Shalev-Shwartz ........................... B60W 30/18163
2020/0192388 A1 * 6/2020 Zhang .................... G05D 1/648
2020/0215972 A1 * 7/2020 Herman .................. B60R 11/04
2020/0391702 A1 * 12/2020 Yamauchi ................ B60Q 9/00
2021/0223374 A1 * 7/2021 Kudla ..................... G01S 17/42
2021/0389467 A1 * 12/2021 Eshel .................... G01S 7/4804
2022/0035376 A1 2/2022 Laddah et al.
2022/0144219 A1 * 5/2022 D'Onofrio ................ B60S 1/52
2023/0036838 A1 * 2/2023 Slobodyanyuk .... B60W 60/001
2023/0242147 A1 8/2023 Odonnell
2023/0251099 A1 * 8/2023 Kobayashi ......... G01C 21/3679 701/25
2023/0358869 A1 * 11/2023 Wijntjes ................. G03B 17/08
2023/0384580 A1 * 11/2023 Balili ................... G02B 26/005
2025/0065900 A1 * 2/2025 Gideon ................ G06V 20/588
2025/0085407 A1 * 3/2025 Ravi Kumar ........... G01S 17/89
2025/0136122 A1 * 5/2025 Chou ...................... G01S 17/86

FOREIGN PATENT DOCUMENTS

| | | | |
|---|---|---|---|
| EP | 3850539 | B1 | 5/2024 |
| WO | 2018026603 | A1 | 2/2018 |

* cited by examiner

DETERMINING A LENS COVERAGE CONDITION OF A LIGHT-BASED SCANNING DEVICE ARRANGED IN A VEHICLE

CROSS REFERENCE TO RELATED APPLICATIONS

The present application claims benefit of priority to European Patent Application No. 23213580.6, filed Dec. 1, 2023, and is assigned to the same assignee as the present application and is incorporated herein by reference in its entirety.

TECHNICAL FIELD

The disclosure relates generally to light-based scanning devices used in vehicles. In particular aspects, the disclosure relates to determining a lens coverage condition of a light-based scanning device arranged in a vehicle. The disclosure can be applied to heavy-duty vehicles, such as trucks, buses, construction equipment, working machines, among other vehicle types. Although the disclosure may be described with respect to a particular vehicle, the disclosure is not restricted to any particular vehicle.

BACKGROUND

Light-based scanning devices in vehicles can be utilized for advanced driver assistance systems to enhance real-time mapping, provide object detection, enable autonomous driving capabilities, and much more. Malfunctions of a light-based scanning device may result in incorrect perceptions of the surroundings of the vehicle, ultimately leading to safety compromises, navigation inaccuracies, and improper vehicle operations, to name a few potentially critical issues. These issues may arise directly from the partial obstruction of the field of view of an associated lens of the light-based scanning device.

It is therefore desired to provide systems, methods and other approaches that attempt to resolve or at least mitigate one or more of these issues.

SUMMARY

According to a first aspect of the disclosure, a computer system for determining a lens coverage condition of a light-based scanning device arranged in a vehicle is provided. The computer system comprises processing circuitry configured to: obtain light data from the light-based scanning device; obtain trajectory data of an upcoming trajectory of the vehicle; generate a frame of reference for the light-based scanning device, the frame of reference indicating positional relationships of a plurality of light points based on the light data and a plurality of trajectory points based on the trajectory data; for one or more given trajectory points, identify a non-overlapping region in the frame of reference where no light points are collocated at the one or more given trajectory points; and determine the lens coverage condition based on a position of the vehicle in relation to the identified non-overlapping region. The first aspect of the disclosure may seek to determine a lens coverage condition of a light-based scanning device. A technical benefit may include establishing that the light-based scanning device functions as intended which ensures accurate environmental perception, navigation and vehicle operations, thus improving the general safety and operational efficiency.

Optionally, in some examples, the processing circuitry is configured to generate the frame of reference by projecting the plurality of trajectory points onto a surface of the field of view of the light-based scanning device such that a common coordinate system comprising the plurality of light points of the light data and the plurality of trajectory points of the trajectory data is obtained. A technical benefit may include a seamless integration, accurate analysis and meaningful comparison between the two data sets, thereby facilitating robust decision-making and comprehensive insights regarding the lens coverage condition.

Optionally, in some examples, the frame of reference comprises a discrete map having a plurality of interconnected tiles being a tessellation of the field of view of the light-based scanning device, the light points and the trajectory points being contained in one or more of the interconnected tiles. A technical benefit of generating the discrete map with tiles (as opposed to, for instance, high definition maps) may include a reduced data storage, faster processing speeds, and improved scalability for determining the lens coverage condition.

Optionally, in some examples, the non-overlapping region is identified by processing the tiles of the discrete map. A technical benefit may include an efficient, reliable and accurate identification of the non-overlapping region.

Optionally, in some examples, the processing circuitry is further configured to determine the lens coverage condition by comparing a closest distance between the vehicle and the non-overlapping region in relation to a safety buffer distance defining a safe distance to a surface of a scanned environment required for a continued operation of the vehicle based on a current driving profile. A technical benefit may include a safe operation of the vehicle based on current driving characteristics.

Optionally, in some examples, the current driving profile depends on one or more of braking properties of the vehicle, a weight of the vehicle, a weight of currently loaded material on the vehicle, a current speed of the vehicle, and ambient conditions. A technical benefit may include a safe operation of the vehicle based on current driving characteristics.

Optionally, in some examples, in response to the lens coverage condition indicating that an external material is present on a lens of the light-based scanning device, the processing circuitry is further configured to control a removal of the external material, wherein controlling the removal comprises: automatically controlling a cleaning device of the vehicle to remove the external material present on the lens, or automatically controlling the vehicle to travel to a location where a subsequent removal of the external material present on the lens can be carried out. A technical benefit may include a customized control for resolving a situation where a lens is at least partially controlled by an external material. By automatically controlling a cleaning device or an external cleaning device, the safety and drivability of the vehicle is improved.

Optionally, in some examples, in response to the lens coverage condition indicating that a field of view of the lens of the light-based scanning device is at least partially covered, the processing circuitry is further configured to automatically control a braking system of the vehicle to cause a standstill or a speed limitation of the vehicle. A technical benefit may include combining intelligent activation of the braking system depending on the condition of the lens of the light-based scanning device, which leads to an improved safety of the operation of the vehicle.

Optionally, in some examples, the lens coverage condition is determined as at least partially covered due to an external material being present on at least portions of a lens of the light-based scanning device, the external material being one or more of mud, dust, sand, water, ice, snow and bugs. A technical benefit may include an improved safety of operation of the vehicle.

Optionally, in some examples, including in at least one preferred example, the lens coverage condition is determined as at least partially covered due to hardware degradation of the light-based scanning device. A technical benefit may include an improved safety of operation of the vehicle.

Optionally, in some examples, the trajectory data is obtained from one or more of a route planning system, a road estimation system, and a predefined road network. A technical benefit may include obtaining an accurate representation of the future movement of the vehicle so that the trajectory points can be mapped to the light points with greater accuracy, thereby improving the performance of the lens coverage condition determination.

According to a second aspect of the disclosure, a vehicle comprising the computer system of the first aspect is provided. The second aspect of the disclosure may seek to determine a lens coverage condition of a light-based scanning device. A technical benefit may include establishing that the light-based scanning device functions as intended which ensures accurate environmental perception, navigation and vehicle operations, thus improving the general safety and operational efficiency of the vehicle comprising the computer system.

According to a third aspect of the disclosure, a computer-implemented method for determining a lens coverage condition of a light-based scanning device arranged in a vehicle is provided. The method comprises obtaining, by processing circuitry of a computer system, light data from the light-based scanning device; obtaining, by the processing circuitry, trajectory data of an upcoming trajectory of the vehicle; generating, by the processing circuitry, a frame of reference for the light-based scanning device, the frame of reference indicating positional relationships of a plurality of light points based on the light data and a plurality of trajectory points based on the trajectory data; for one or more given trajectory points, identifying, by the processing circuitry, a non-overlapping region in the frame of reference where no light points are collocated at the one or more given trajectory points; and determining, by the processing circuitry, the lens coverage condition based on a position of the vehicle in relation to the identified non-overlapping region. The third aspect of the disclosure may seek to determine a lens coverage condition of a light-based scanning device. A technical benefit may include establishing that the light-based scanning device functions as intended which ensures accurate environmental perception, navigation and vehicle operations, thus improving the general safety and operational efficiency.

According to a fourth aspect of the disclosure, a computer program product is provided. The computer program product comprises program code for performing, when executed by the processing circuitry, the method of the third aspect. The fourth aspect of the disclosure may seek to determine a lens coverage condition of a light-based scanning device. A technical benefit may include that new vehicles and/or legacy vehicles may be conveniently configured, by software installation/update, to benefit from a more accurate environmental perception, navigation and vehicle operations, thus improving the general safety and operational efficiency of the new vehicles and/or legacy vehicles.

According to a fifth aspect of the disclosure, a non-transitory computer-readable storage medium is provided. The non-transitory computer-readable storage medium comprises instructions, which when executed by the processing circuitry, cause the processing circuitry to perform the method of the third aspect. The fifth aspect of the disclosure may seek to determine a lens coverage condition of a light-based scanning device. A technical benefit may include that new vehicles and/or legacy vehicles may be conveniently configured, by software installation/update, to benefit from a more accurate environmental perception, navigation and vehicle operations, thus improving the general safety and operational efficiency of the new vehicles and/or legacy vehicles.

The disclosed aspects, examples, and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

DETAILED DESCRIPTION

Figure 1:
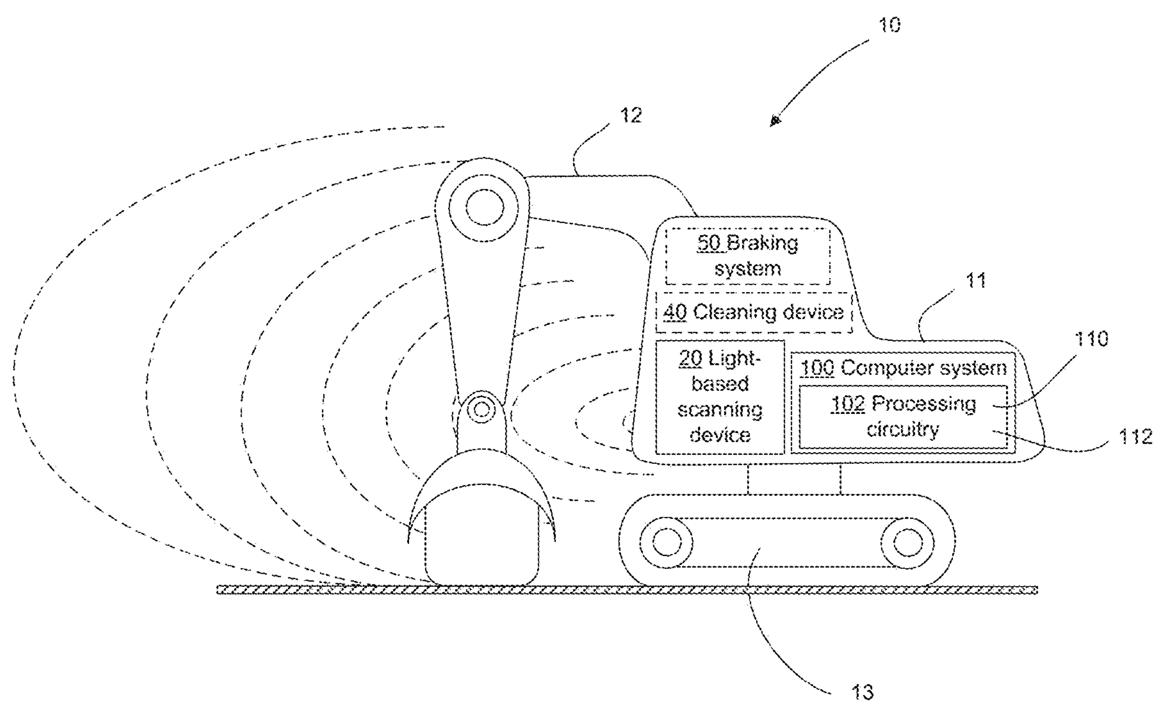
FIG. 1 is an exemplary illustration of a vehicle comprising a computer system, according to an example.

The detailed description set forth below provides information and examples of the disclosed technology with sufficient detail to enable those skilled in the art to practice the disclosure.

The present disclosure addresses the issues mentioned in the background section by determining a lens coverage condition using a computer-controlled approach. The approach involves obtaining light data from the device and trajectory data of an upcoming vehicle trajectory, and generating a frame of reference for the light-based scanning device. The frame of reference includes a set of trajectory points and light points based on the obtained data. The present inventor has come to the insightful realization that regions (hereinafter referred to as non-overlapping regions) of the generated frame of reference where light points are not collocated at trajectory points are results of some issue with the field of view of the lens. By identifying the non-overlapping regions and comparing a location thereof in relation to a location of the vehicle where the light-based scanning device is arranged, it is thus possible to determine the lens coverage condition.

Before going into the particulars of the present disclosure and the related drawings, the term lens coverage condition is defined. As used in the present disclosure, the term lens coverage condition refers to a condition of a lens of a light-based scanning device, more specifically the field of view of the lens. As indicated in the background section, it is desired to know whether the light-based scanning device functions properly such that real-time mapping, object detection, autonomous driving capabilities, or the like, can be carried out without potential malfunctions. The lens coverage condition may comprise a plurality of different information relating to the condition of the lens. The different information may be determined singly, or one or more in combination.

The information provided by the lens coverage condition may relate to whether the field of view of the lens is at least partially obstructed or covered. By knowing whether there is an at least partial coverage present on the lens, it can be established that one or more actions need to be taken. Such actions can involve one or more of stopping a vehicle or limiting its speed, performing a cleaning procedure of the lens, driving towards a cleaning station for performing a cleaning procedure of the lens, alerting a driver of the vehicle, sending out a remote notification to an external unit that there is a malfunctioning device, performing an emergency vehicle operation such as a sudden steering maneuver, and so forth.

The information provided by the lens coverage condition may relate to a cause of a partial obstruction or coverage of the lens. By knowing the cause of the at least partial coverage, a more intelligent subsequent control can be carried out which is better suited for the prevailing situation. In some examples, the at least partial coverage may be due to an external material being present on at least portions of the lens. The external material may be one or more of mud, dust, sand, water, ice, snow and bugs, to name a few exemplary external materials that can obstruct the field of view of the lens. In some examples, the at least partial coverage may be due to hardware degradation of the light-based scanning device. Depending on the cause of the obstruction, different course of action may be taken (e.g. to clean the lens or repair parts of the device).

The information provided by the lens coverage condition may relate to what extent the field of view of the lens is at least partially obstructed or covered. By knowing to what extent the field of view of the lens is covered, even more intelligent subsequent control can be carried out. For example, the cleaning procedure may be suited to the prevailing coverage situation (for example recommending a more or less intense cleaning), or different maintenance or repair (or even replacement) actions for resolving hardware degradation of the light-based scanning device can be recommended.

The information provided by the lens coverage condition may relate to where the field of view of the lens is at least partially obstructed or covered. By knowing where the field of view is covered, yet more intelligent subsequent control can be carried out. For example, the cleaning procedure may be directed at a particular location, or a maintenance procedure may be directed at a particular location of the lens.

The information provided by the lens coverage condition may relate to a recommended action to be carried out for resolving the potential obstruction or coverage of the lens. The recommended action may be one or more of those described above, i.e., stopping the vehicle or limiting its speed, performing a cleaning procedure of the lens, driving towards a cleaning station for performing a cleaning procedure of the lens, alerting a driver of the vehicle, sending out a remote notification to an external unit that there is a malfunctioning device, performing an emergency vehicle operation such as a sudden steering maneuver, and so forth.

FIG. 1 is an exemplary illustration of a vehicle 10 in which one or more of the inventive concept of the present disclosure can be applied. The vehicle 10 may be any suitable vehicle that can utilize light-based scanning devices for scanning its surroundings, including but not limited to heavy-duty vehicles, such as trucks, buses, working machines, construction equipment, among other vehicle types. The concepts of the present disclosure may be particularly useful for working machine adapted to operate in adverse conditions typically associated with uneven and/or inaccessible terrains, such as work sites, construction sites, excavation sites, agricultural areas, wildlife areas, or the like. This is due to light-based scanning devices tending to be at higher risk of malfunctioning as a consequence of lens obstruction issues in these terrains. However, it shall be understood that the approaches discussed herein can alternatively be applied for any vehicle, in any driving scenario, and in any terrain regardless of its adversity.

The vehicle 10 is in FIG. 1 depicted as a working machine, more specifically an excavator. The excavator comprises a main body portion 11, a material carrying portion 12 and a movement enabling portion 13. The excavator comprises a plurality of devices which in the illustration are arranged in the main body portion 11. However, this is just for illustrative purposes. It shall be understood that the placement of one or more of these devices is not necessarily of relevance, and that they may in alternative examples be provided anywhere else in the vehicle 10, such as in the material carrying portion 12 or the movement enabling portion 13, or possibly even external to the vehicle 10.

The vehicle 10 comprises a light-based scanning device 20. The light-based scanning device 20 is arranged in the vehicle 10. The light-based scanning device 20 may be any known light-based scanning device known in the art, such as a lidar device, a radar device, a 2D camera, a 3D camera, or any combination thereof. The light-based scanning device 20 is generally configured to operate on the principle of emitting light, capturing the reflections, and analyzing the resulting data to obtain information about an environment. The environment relates to an environment surrounding the vehicle 10 and may include one or more targets, such as objects including other vehicles, buildings, people, containers, hills, material heaps, or the like, that are present in the environment where the vehicle 10 is operating. The light-based scanning device 20 may comprise a light source, such as a laser or LED, being configured to emit beams of light towards the environment. The interaction between the emitted light and the surface of the environment causes reflections, which may then be detected by one or more sensors of the light-based scanning device 20. The light-based scanning device 20 comprises one or more lenses through which the reflected light is received. By analyzing a lens coverage condition of the one or more lenses using approaches described herein, it is possible to determine whether a field of view of a lens is at least partially covered, a cause of the coverage, an extent of the coverage, a location of the coverage, and/or a recommended action for resolving the coverage.

Although the present disclosure primarily refers to determining a lens coverage condition of one light-based scanning device, such as the light-based scanning device 20, other examples are readily envisaged. In some examples, the determination may be carried out for a single light-based scanning device having a plurality of lenses, each lens having a certain lens coverage condition. In some examples, the determination may be carried out for a plurality of light-based scanning devices having one lens each, the lens coverage condition being determined for the lenses of the respective light-based scanning devices. In some examples, the determination may be carried out for a plurality of light-based scanning devices, each light-based scanning device having a plurality of lenses. No limitations shall thus be construed in this regard.

The vehicle 10 further comprises a computer system 100 comprising processing circuitry 102. The processing circuitry 102 is configured to obtain light data 110 from the light-based scanning device 20 and trajectory data 112 of an upcoming trajectory of the vehicle 10. The processing circuitry 102 is further configured to generate a frame of reference for the light-based scanning device 20, the frame of reference indicating positional relationships between a plurality of light points based on the light data 110 and a plurality of trajectory points based on the trajectory data 112. The processing circuitry 102 is further configured to, for one or more given trajectory points, identify a non-overlapping region in the frame of reference where no light points are collocated at the one or more given trajectory points. The processing circuitry 102 is further configured to determine a lens coverage condition of the light-based scanning device 20 based on a position of the vehicle 10 is relation to the identified non-overlapping region.

In this example the computer system 100 is arranged in the vehicle 10, but in other examples the computer system 100 may be provided externally to the electric material handling machine 10, for instance in a cloud-based service. The cloud-based service may be configured to communicate with the processing circuitry 102 of the electric material handling machine 10 for purposes of providing a lens coverage determination. In yet alternative examples, some parts of the computer system 100 is arranged in the vehicle 10 while other parts of the computer system 100 is arranged in the cloud service.

The vehicle 10 may further comprise a cleaning device 40. The cleaning device 40 may be any suitable cleaning device known in the art adapted to carry out a cleaning procedure of a lens of a light-based scanning device. Such cleaning devices known in the art may include a compressed air cleaning device adapted to blow away external materials from the lens, a lens cleaning brush for sweeping away external materials, or a liquid cleaning device using e.g. a soluble, to name a few exemplary cleaning devices. The cleaning device 40 may be arranged in conjunction with the light-based scanning device 20. Based on the determination of the lens coverage condition, the cleaning device 40 may be controlled by the computer system 100. The control of the cleaning device 40 may be automatic in response to a determination of the lens coverage condition, or optionally after a predetermined delay. In some examples, the cleaning device 40 is remotely located, for example at a cleaning station on a site where the vehicle 10 is operating, a gas station, a charging station, or a similar facility where the vehicle 10 may pass (and possibly stop) to have its light-based scanning device 20 cleaned. For the remotely located cleaning device 40, the activation thereof may be initiated once the vehicle 10 is within a predetermined distance of the remotely located cleaning device 40. The predetermined distance may be a distance sufficiently close such that the remotely located cleaning device may reach the light-based scanning device 20.

The vehicle 10 may further comprise a braking system 50. Based on the determination of the lens coverage condition, the braking system 50 may be (automatically) controlled by the computer system 100. The braking system 50 may be any suitable braking system known in the art adapted to inhibit the speed of the vehicle 10.

Figure 2:
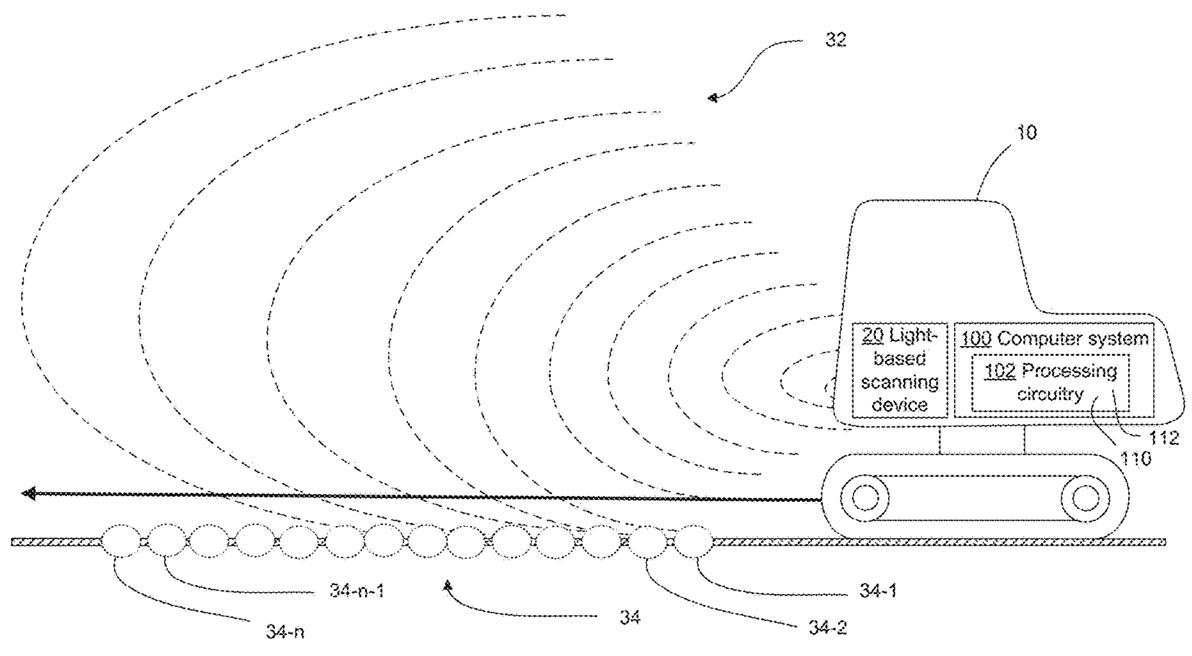
FIG. 2 is an exemplary illustration of a computer system configured to obtain light data and trajectory data, according to an example.

FIG. 2 shows an exemplary visualization of how the computer system 100, and more specifically the processing circuitry 102 thereof, can be configured to obtain light data 110 and trajectory data 112.

The light data 110 comprises a plurality of light points 32. The light points 32 refer to individual data points generated by sensors of the light-based scanning device 20 in response to receiving reflected light from the environment. The light points 32 may be obtained as a point cloud, where each light point 32 in the point cloud corresponds to a specific coordinate in space, i.e., having a representation of a location in 3D with respective x, y and z coordinates. Light points in 2D are also a possibility. The density and resolution of the point cloud may depend on various factors of the light-based scanning device 20, such as sensor specifications, scanning mechanisms, data processing techniques, etc. The point cloud may be generated by the light-based scanning device 20 itself, or sent to the computer system 100 as raw data which in turn is configured to generate the point cloud.

The trajectory data 112 comprises a plurality of trajectory points 34. The trajectory points 34 refer to specific locations or waypoints along a planned trajectory or route of the vehicle 10, where the trajectory represents a path on which the vehicle 10 is expected to follow from one point to another. The trajectory points 34 thus play a role in defining the route and guiding movement of the vehicle 10 along the route. The route may comprise an origin trajectory point 34-1, one or more subsequent trajectory points 34-2, **34-*n*−1, and a destination trajectory point 34-*n*. The granularity of the trajectory points 34 may vary depending on requirements of the driving operation of the vehicle 10. Generally, denser sets of trajectory points 34 correspond to more precise navigation. The trajectory data 112 may be obtained by the computer system 100** through one or more of a route planning system, a road estimation system, and a predefined road network.

Based on the obtained light data 110 and trajectory data 112, the computer system 100, and more specifically the processing circuitry 102 thereof, is configured to generate a frame of reference 30 for the light-based scanning device 20. This is shown in FIG. 3 according to one example.

Figure 3:
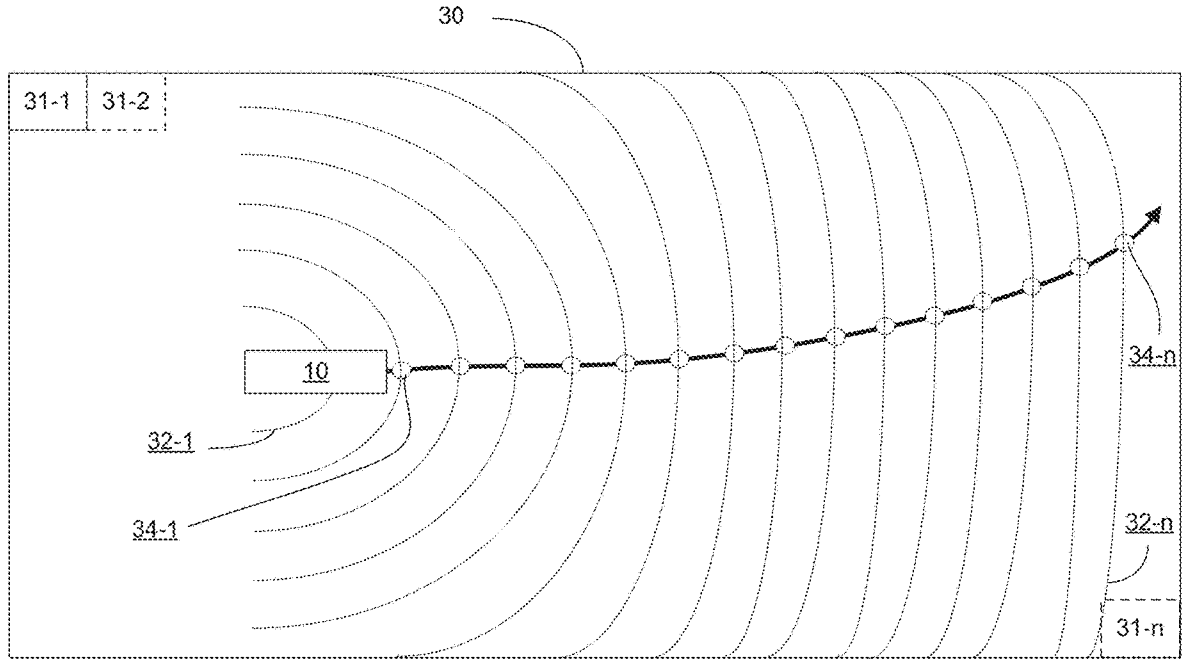
FIG. 3 is an exemplary illustration of generation of a frame of reference, according to an example.

FIG. 3 shows an exemplary frame of reference 30 which indicates positional relationships between the light points 32 and the trajectory points 34. The frame of reference 30 is a common reference system involving a combined view of both the light points 32 and the trajectory points 34. Generating the frame of reference 30 may be carried out by projecting the trajectory points 34 onto a surface of the field of view of the light-based scanning device 20, and more specifically a lens thereof. To this end, a common coordinate system comprising the plurality of light points 32 and the plurality of trajectory points 34 is obtained. The common coordinate system may be a 3D coordinate system or a 2D coordinate system. The projection can be done by performing one or more mathematical transformations of the trajectory points 34 into the coordinate system of the point cloud of the light points 32. The mathematical transformation may be performed by employing any transform functions known in the art, such as translation, scaling, rotation, affine transformation, homogeneous transformation, or the like. While the common reference system is typically generated using 3D transforms, FIG. 3 shows the 3D coordinate system from a top view, i.e., in 2D, purely for illustrative purposes.

The exemplary frame of reference 30 of FIG. 3 is generated as a discrete map having a plurality of interconnected tiles 31-1, 31-2, 31-*n*. For illustrative purposes only a few tiles 31 are shown, but it shall be understood that the entire frame of reference 30, or at least portions thereof, such as portions where light points 32 and/or trajectory points 34 are located, may be accommodated by tiles 31. The tiles 31 together form a tessellation of the field of view of the light-based scanning device 20, and the light points 32 and the trajectory points 34 are contained in one or more of the interconnected tiles 31. The tessellation of the field of view may be used for subdividing the field of view into smaller, typically polygonal, components, as shown in the illustration. The level of tessellation may be adjusted based on various factors such as characteristics of the light-based scanning device 20, operating conditions of the vehicle 10, required accuracy of the scanning, and the like. In the example of FIG. 3 the tiles 31 are of equal size and shape, but in other examples any number of tiles may have any suitable size and/or shape. The disclosure is not limited to any particular arrangement of tiles. The construction of the discrete map in this way may enable an efficient approach for performing further calculations such that information can be retrieved from the discrete map. Such information may include time taken for the light to travel to the target and back (i.e., time-of-flight), or changes in properties of the light upon reflection (such as structured light or laser triangulation). It shall be understood that the discrete map is not required for purposes of determining the lens coverage condition, although it may be computationally beneficial. This approach may eliminate the need for having more or less complex maps of higher definition that simulate the environment which the vehicle 10 is adapted to operate in.

Figure 4:
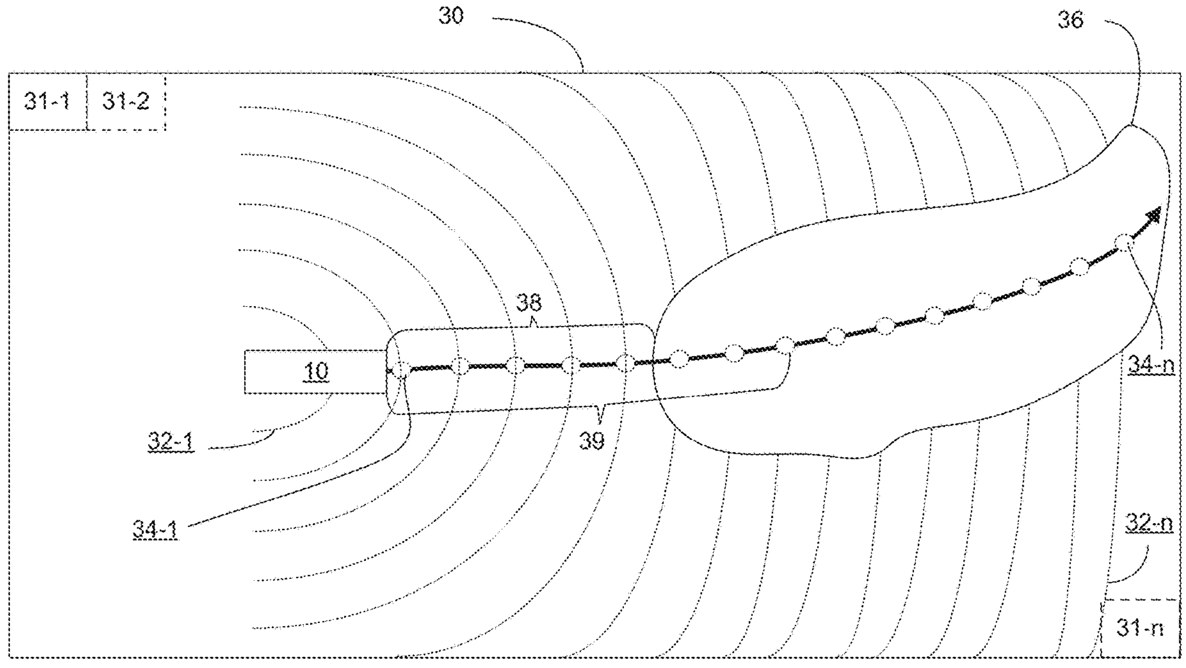
FIG. 4 is an exemplary illustration of determining a lens coverage condition, according to one example.

In FIG. 4, an example of identifying a non-overlapping region 36 is shown. The non-overlapping region 36 is an area or space of the frame of reference 30 where no light points 32 are collocated, i.e., are present at the same location, as trajectory points 34. The size and form of the non-overlapping region 36 depend on the presence or absence of light points 32 at trajectory points 34, and shall thus not be limited to any particular size or form. The reason why non-overlapping regions 36 can be identified is because of light emitted by the light-based scanning device 20 not being reflected back from certain locations of the environment. No light points 32 for the certain locations can accordingly be established. In situations where no common frame of reference 30 for the light points 32 and the trajectory points 34 is generated, this is typically due to the fact that the light has been emitted towards a location where there is no surface, such as the sky. However, since the frame of reference 30 in the present disclosure also includes trajectory data 34 of a planned route of the vehicle 10, this cannot be the case. This is because of the fact that no routes will obviously be planned at locations where there is no surface on which the vehicle 10 can possibly travel. Hence, the present inventor has insightfully realized that the absence of light points 32 at one or more given trajectory points 34 is an indication that there is some issue with the lens of the light-based scanning device 20. Therefore, based on the position of the vehicle 10 in relation to the identified non-overlapping region 36, a lens coverage condition is determined.

The lens coverage condition may be determined by comparing a closest distance 38 between the vehicle 10 and the non-overlapping region 36 in relation to a safety buffer distance 39. The closest distance 38 may be known directly from location data obtained through the light-based scanning device 20, using for example time-of-flight data as discussed above. Alternatively, the closest distance 38 may be calculated using an Euclidean distance measurement function based on obtaining location data of the vehicle 10, for example through a GPS/GNSS service, and location data of the non-overlapping region 36, for instance from the light-based scanning device 20. Yet alternatively, more advanced algorithms may be applied including for instance a brute force search, bounding volume hierarchy, k-Dimensional tree, closest pair of points, or the like.

In examples where a discrete map involving a plurality of tiles 31 has been generated, the non-overlapping region 36 may be identified by processing the tiles 31 of the discrete map. This may be done by comparing a position of the vehicle 10 to a position of one or more tiles 31 that are presently accommodating the non-overlapping region 36. The non-overlapping region 36 may therefore extend across one or more of the tiles 31, as is the case in the shown example. The processing may be carried out using a closest distance measurement technique as discussed above. In other examples, the processing may be carried out by applying one or more image processing techniques, such as edge detection, feature matching, distance transform, correlation analysis, geometric transformations, or the like, to the discrete map.

The safety buffer distance 39 defines a safe distance to a surface of a scanned environment required for a continued operation of the vehicle 10 based on a current driving profile. The surface of the scanned environment corresponds to the surface where the light is reflected for a specific light point.

In the example of FIG. 4, the closest distance 38 is less than the safety buffer distance 39. This indicates that continued operation of the vehicle 10 based on the current driving profile is for some reason no longer safe. This can for example be due to an object approaching the vehicle 10 so that a braking or steering action should be carried out. The safety buffer distance 39 may be predetermined by the processing circuitry 102, and relates to the current driving profile of the vehicle 10. The current driving profile may depend on braking properties of the vehicle 10, a weight of the vehicle 10, a weight of currently loaded material on the vehicle 10, a current speed of the vehicle 10, and ambient conditions. The ambient conditions may include a temperature, a surface friction coefficient, a humidity factor, a visibility factor, a terrain adversity coefficient, or other such conditions that may have an effect on the operability of the vehicle 10.

In some examples, in response to the lens coverage condition indicating that an external material is present on the lens, the processing circuitry 102 may be configured to control a removal of the external material. This may be done by causing a controlled actuation of the cleaning device 40 as discussed with reference to FIG. 1. In other examples, controlling the removal may involve automatically controlling the vehicle 10 to travel to a location where a subsequent removal of the external material present on the lens can be carried out. As described above, this may be a cleaning station, a charging station, a gas station, or the like.

In some examples, in response to the lens coverage condition indicating an at least partial coverage of the lens, the processing circuitry 102 may be configured to automatically control the braking system 50 as discussed with reference to FIG. 1 to cause a standstill of the vehicle 10. Alternatively, the processing circuitry 102 may be configured to automatically control the braking system 50 to cause a speed limitation of the vehicle 10. The speed limitation or standstill may be caused for a predetermined time period. This time period may for example be until the lens has been cleaned, until the light-based scanning device 20 has been repaired, or until an external object that caused the braking of the vehicle 10 has been removed from the vicinity of the vehicle 10. After the predetermined time period has lapsed, the processing circuitry 102 may be configured to cancel control of the braking system 50.

In some examples, in response to the lens coverage condition indicating that a field of view of the lens is at least partially covered, the processing circuitry 102 may be configured to generate a warning signal. The warning signal may be in the form of a computer signal to a driver system for automatic control of the vehicle 10. The warning signal may be in the form of a visual, auditory or haptic cue, for instance provided to the driver of the vehicle 10 through corresponding graphical user interfaces, speakers, tactile devices, or the like. The warning signal may additionally or alternatively involve an external transmission to a centralized server, such as a cloud-based service configured to monitor one or more vehicles 10. The warning signal may then be processed by the cloud-based service to perform further diagnostics of the operation of the vehicle 10.

Figure 5:
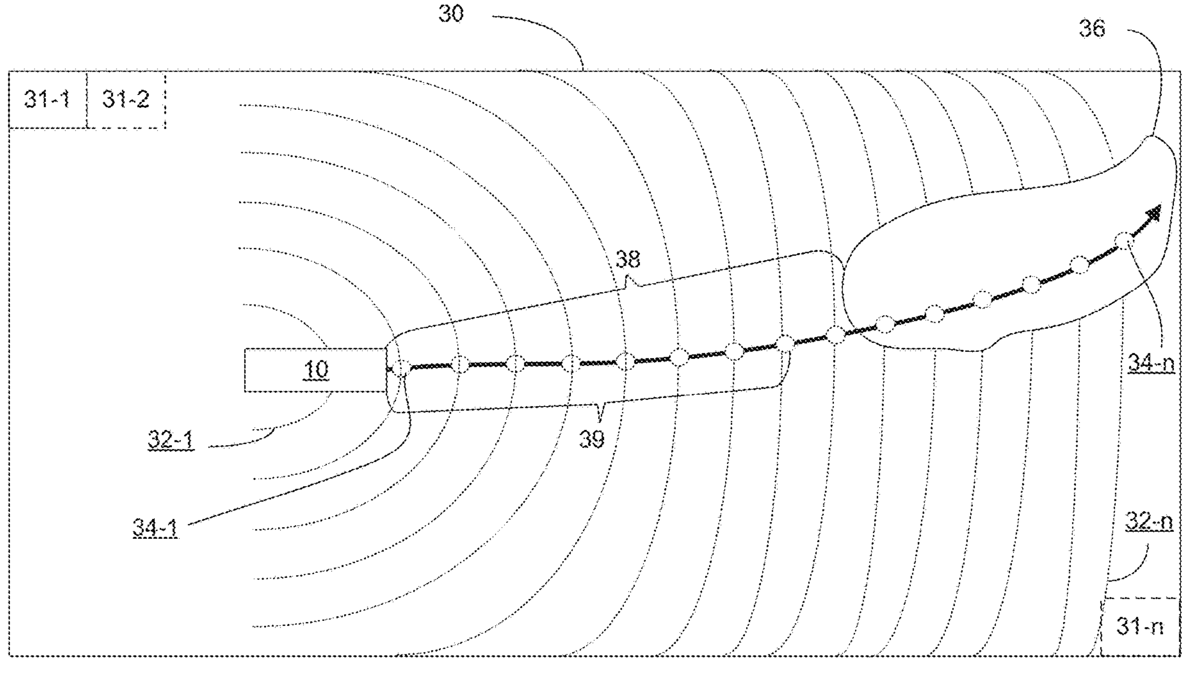
FIG. 5 is an exemplary illustration of determining a lens coverage condition, according to one example.

In FIG. 5, another example of identifying a non-overlapping region 36 is shown. As seen in the visualization, the closest distance 38 between the vehicle 10 and the non-overlapping region 36 is in this example greater than the safety buffer distance 39. This may be an indication that, although there may be a coverage of the lens, the vehicle 10 is still operating under safe conditions. For instance, there may not be a potential object in an immediate vicinity of the vehicle 10, and it can thus be allowed to continue driving forward for some time until the safety buffer distance 39 is violated, as was seen and explained with reference to FIG. 4.

Figure 6:
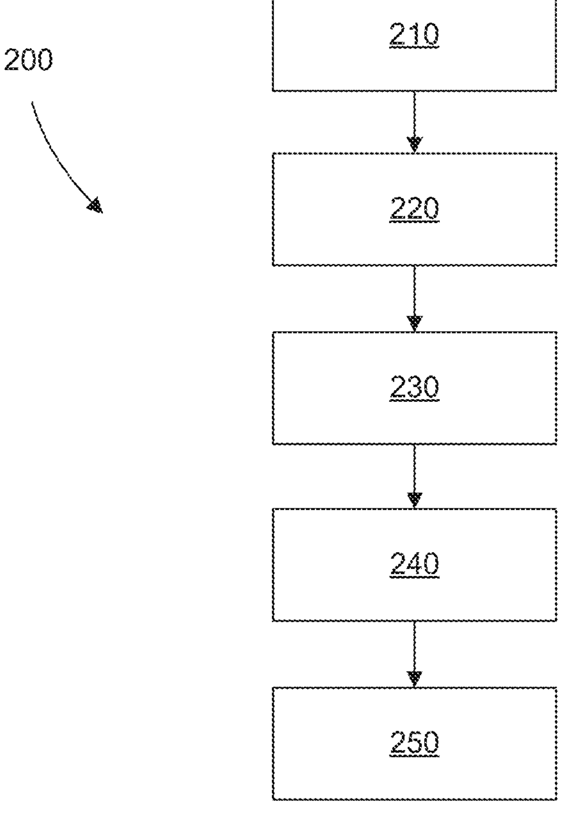
FIG. 6 is a flowchart of an exemplary computer-implemented method for determining a lens coverage condition, according to an example.

FIG. 6 is a flowchart of a computer-implemented method 200 for determining a lens coverage condition of a light-based scanning device 20 arranged in a vehicle. The method 200 comprises obtaining 210, by processing circuitry 102 of a computer system 100, light data 110 from the light-based scanning device 20. The method 200 further comprises obtaining 220, by the processing circuitry 102, trajectory data 112 of an upcoming trajectory of the vehicle 10. The method 200 further comprises generating 230, by the processing circuitry 102, a frame of reference 30 for the light-based scanning device 20, the frame of reference 30 indicating positional relationships of a plurality of light points 32 based on the light data 110 and a plurality of trajectory points 34 based on the trajectory data 112. The method 200 further comprises, for one or more given trajectory points 32, identifying 240, by the processing circuitry 102, a non-overlapping region 36 in the frame of reference 30 where no light points are collocated at the one or more given trajectory points 32. The method 200 further comprises determining 250, by the processing circuitry 102, the lens coverage condition based on a position of the vehicle 10 in relation to the identified non-overlapping region 36.

Figure 7:
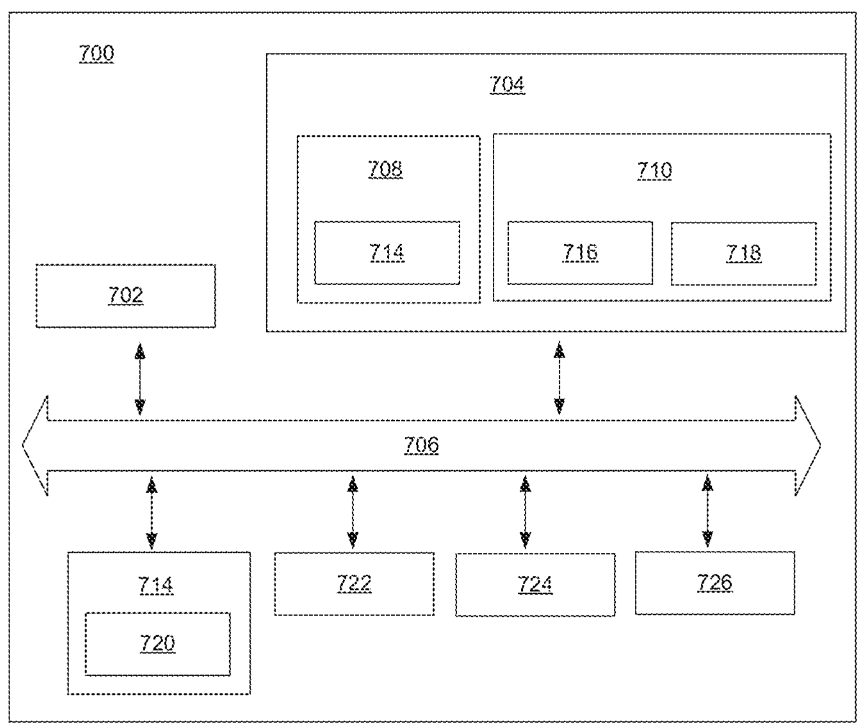
FIG. 7 is a schematic diagram of an exemplary computer system for implementing examples disclosed herein, according to an example.

FIG. 7 is a schematic diagram of a computer system 700 for implementing examples disclosed herein. The computer system 700 is adapted to execute instructions from a computer-readable medium to perform these and/or any of the functions or processing described herein. The computer system 700 may be connected (e.g., networked) to other machines in a LAN (Local Area Network), LIN (Local Interconnect Network), automotive network communication protocol (e.g., FlexRay), an intranet, an extranet, or the Internet. While only a single device is illustrated, the computer system 700 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 700 may comprise at least one computing device or electronic device capable of including firmware, hardware, and/or executing software instructions to implement the functionality described herein. The computer system 700 may include processing circuitry 702 (e.g., processing circuitry including one or more processor devices or control units), a memory 704, and a system bus 704. The computer system 700 may include at least one computing device having the processing circuitry 702. The system bus 704 provides an interface for system components including, but not limited to, the memory 704 and the processing circuitry 702. The processing circuitry 702 may include any number of hardware components for conducting data or signal processing or for executing computer code stored in memory 704. The processing circuitry 702 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 702 may further include computer executable code that controls operation of the programmable device.

The system bus 704 may be any of several types of bus structures that may further interconnect to a memory bus (with or without a memory controller), a peripheral bus, and/or a local bus using any of a variety of bus architectures. The memory 704 may be one or more devices for storing data and/or computer code for completing or facilitating methods described herein. The memory 704 may include database components, object code components, script components, or other types of information structure for supporting the various activities herein. Any distributed or local memory device may be utilized with the systems and methods of this description. The memory 704 may be communicably connected to the processing circuitry 702 (e.g., via a circuit or any other wired, wireless, or network connection) and may include computer code for executing one or more processes described herein. The memory 704 may include non-volatile memory 708 (e.g., read-only memory (ROM), erasable programmable read-only memory (EPROM), electrically erasable programmable read-only memory (EEPROM), etc.), and volatile memory 710 (e.g., random-access memory (RAM)), or any other medium which can be used to carry or store desired program code in the form of machine-executable instructions or data structures and which can be accessed by a computer or other machine with processing circuitry 702. A basic input/output system (BIOS) 712 may be stored in the non-volatile memory 708 and can include the basic routines that help to transfer information between elements within the computer system 700.

The computer system 700 may further include or be coupled to a non-transitory computer-readable storage medium such as the storage device 714, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 714 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 714 and/or in the volatile memory 710, which may include an operating system 716 and/or one or more program modules 718. All or a portion of the examples disclosed herein may be implemented as a computer program 720 stored on a transitory or non-transitory computer-usable or computer-readable storage medium (e.g., single medium or multiple media), such as the storage device 714, which includes complex programming instructions (e.g., complex computer-readable program code) to cause the processing circuitry 702 to carry out actions described herein. Thus, the computer-readable program code of the computer program 720 can comprise software instructions for implementing the functionality of the examples described herein when executed by the processing circuitry 702. In some examples, the storage device 714 may be a computer program product (e.g., readable storage medium) storing the computer program 720 thereon, where at least a portion of a computer program 720 may be loadable (e.g., into a processor) for implementing the functionality of the examples described herein when executed by the processing circuitry 702. The processing circuitry 702 may serve as a controller or control system for the computer system 700 that is to implement the functionality described herein.

The computer system 700 may include an input device interface 722 configured to receive input and selections to be communicated to the computer system 700 when executing instructions, such as from a keyboard, mouse, touch-sensitive surface, etc. Such input devices may be connected to the processing circuitry 702 through the input device interface 722 coupled to the system bus 704 but can be connected through other interfaces, such as a parallel port, an Institute of Electrical and Electronic Engineers (IEEE) 1394 serial port, a Universal Serial Bus (USB) port, an IR interface, and the like. The computer system 700 may include an output device interface 724 configured to forward output, such as to a display, a video display unit (e.g., a liquid crystal display (LCD) or a cathode ray tube (CRT)). The computer system 700 may include a communications interface 726 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Example 1: A computer system (100; 500) for determining a lens coverage condition of a light-based scanning device (20) arranged in a vehicle (10), the computer system (100; 500) comprising processing circuitry (102; 502) configured to: obtain light data (110) from the light-based scanning device (20); obtain trajectory data (112) of an upcoming trajectory of the vehicle (10); generate a frame of reference (30) for the light-based scanning device (20), the frame of reference (30) indicating positional relationships of a plurality of light points (32) based on the light data (110) and a plurality of trajectory points (34) based on the trajectory data (112); for one or more given trajectory points (32), identify a non-overlapping region (36) in the frame of reference (30) where no light points (34) are collocated at the one or more given trajectory points (32); and determine the lens coverage condition based on a position of the vehicle (10) in relation to the identified non-overlapping region (36).

Example 2: The computer system (100; 500) of example 1, wherein the processing circuitry (102; 502) is configured to generate the frame of reference (30) by projecting the plurality of trajectory points (34) onto a surface of the field of view of the light-based scanning device (20) such that a common coordinate system comprising the plurality of light points (32) of the light data (110) and the plurality of trajectory points (34) of the trajectory data (112) is obtained.

Example 3: The computer system (100; 500) of example 2, wherein the frame of reference (30) comprises a discrete map having a plurality of interconnected tiles (31) being a tessellation of the field of view of the light-based scanning device (20), the light points (32) and the trajectory points (34) being contained in one or more of the interconnected tiles (31).

Example 4: The computer system (100; 500) of example 3, wherein the non-overlapping region (36) is identified by processing the tiles (31) of the discrete map.

Example 5: The computer system (100; 500) of any of examples 1-4, wherein the processing circuitry (102; 502) is further configured to determine the lens coverage condition by comparing a closest distance (38) between the vehicle (10) and the non-overlapping region (36) in relation to a safety buffer distance (39) defining a safe distance to a surface of a scanned environment required for a continued operation of the vehicle (10) based on a current driving profile.

Example 6: The computer system (100; 500) of example 5, wherein the current driving profile on one or more of braking properties of the vehicle (10), a weight of the vehicle (10), a weight of currently loaded material on the vehicle (10), a current speed of the vehicle (10), and ambient conditions.

Example 7: The computer system (100; 500) of any of examples 1-6, wherein in response to the lens coverage condition indicating that an external material is present on a lens of the light-based scanning device (20), the processing circuitry (102; 502) is further configured to control a removal of the external material.

Example 8: The computer system (100; 500) of example 7, wherein controlling the removal comprises automatically controlling a cleaning device (40) of the vehicle (10) to remove the external material present on the lens.

Example 9: The computer system (100; 500) of any of examples 7-8, wherein controlling the removal comprises automatically controlling the vehicle (10) to travel to a location where a subsequent removal of the external material present on the lens can be carried out.

Example 10: The computer system (100; 500) of any of examples 1-9, wherein in response to the lens coverage condition indicating that a field of view of the lens of the light-based scanning device (20) is at least partially covered, the processing circuitry (102; 502) is further configured to automatically control a braking system (50) of the vehicle (10) to cause a standstill of the vehicle (10).

Example 11: The computer system (100; 500) of any of examples 1-9, wherein in response to the lens coverage condition indicating that a field of view of the lens of the light-based scanning device (20) is at least partially covered, the processing circuitry (102; 502) is further configured to automatically control a braking system (50) of the vehicle (10) to cause a speed limitation of the vehicle (10).

Example 12: The computer system (100; 500) of any of examples 10-11, wherein the processing circuitry (102; 502) is further configured to cancel control of the braking system (50) after a cleaning procedure has been carried out.

Example 13: The computer system (100; 500) of any of examples 1-12, wherein in response to the lens coverage condition indicating that a field of view of the lens of the light-based scanning device (20) is at least partially covered, the processing circuitry (102; 502) is further configured to generate a warning signal.

Example 14: The computer system (100; 500) of any of examples 1-13, wherein the lens coverage condition is determined as at least partially covered due to an external material being present on at least portions of a lens of the light-based scanning device (20), the external material being one or more of mud, dust, sand, water, ice, snow and bugs.

Example 15: The computer system (100; 500) of any of examples 1-14, wherein the lens coverage condition is determined as at least partially covered due to hardware degradation of the light-based scanning device (20).

Example 16: The computer system (100; 500) of any of examples 1-15, wherein the light-based scanning device (20) is a lidar device, a radar device, or a camera.

Example 17: The computer system (100; 500) of any of examples 1-16, wherein the trajectory data (112) is obtained from one or more of a route planning system, a road estimation system, and a predefined road network.

Example 18: The computer system (100; 500) of any of examples 1-17, wherein the lens coverage condition indicates whether a field of view of a lens of the light-based scanning device (20) is at least partially covered.

Example 19: The computer system (100; 500) of any of examples 1-18, wherein the lens coverage condition indicates a cause of a coverage of a field of view of a lens of the light-based scanning device (20).

Example 20: The computer system (100; 500) of any of examples 1-19, wherein the lens coverage condition indicates to what extent a field of view of a lens of the light-based scanning device (20) is at least partially covered.

Example 21: The computer system (100; 500) of any of examples 1-20, wherein the lens coverage condition indicates where a field of view of a lens of the light-based scanning device (20) is at least partially covered.

Example 22: The computer system (100; 500) of any of examples 1-21, wherein the lens coverage condition indicates a recommended action to be carried out for resolving a potential coverage of a field of view of a lens of the light-based scanning device (20).

Example 23: A vehicle (10) comprising the computer system (100; 500) of any of examples 1-22.

Example 24: A computer-implemented method (200) for determining a lens coverage condition of a light-based scanning device (20) arranged in a vehicle (10), the method (200) comprising: obtaining (210), by processing circuitry (102; 502) of a computer system (100; 500), light data (110) from the light-based scanning device (20); obtaining (220), by the processing circuitry (102; 502), trajectory data (112) of an upcoming trajectory of the vehicle (10); generating (230), by the processing circuitry (102; 502), a frame of reference (30) for the light-based scanning device (20), the frame of reference (30) indicating positional relationships of a plurality of light points (32) based on the light data (110) and a plurality of trajectory points (34) based on the trajectory data (112); for one or more given trajectory points (32), identifying (240), by the processing circuitry (102; 502), a non-overlapping region (36) in the frame of reference (30) where no light points (34) are collocated at the one or more given trajectory points (32); and determining (250), by the processing circuitry (102; 502), the lens coverage condition based on a position of the vehicle (10) in relation to the identified non-overlapping region (36).

Example 25: A computer program product comprising program code for performing, when executed by the processing circuitry (102; 502), the method (200) of example 24.

Example 26: A non-transitory computer-readable storage medium comprising instructions, which when executed by the processing circuitry (102; 502), cause the processing circuitry (102; 502) to perform the method (200) of example 24.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. A computer-implemented method for determining a lens coverage condition of a light-based scanning device arranged in a vehicle, the method comprising:

obtaining, by processing circuitry of a computer system, light data from the light-based scanning device based on captured reflections of emitted light;

obtaining, by the processing circuitry, trajectory data of an upcoming trajectory of the vehicle;

generating by the processing circuitry, a frame of reference for the light-based scanning device by projecting a plurality of trajectory points, based on the trajectory data, onto a surface of a field of view of the light-based scanning device to obtain a common coordinate system, wherein, the frame of reference comprises a discrete map having a plurality of interconnected tiles being a tessellation of the field of view of the light-based scanning device, the light points and the trajectory points being contained in one or more of the interconnected tiles;

for one or more given trajectory points, identifying, by the processing circuitry, a non-overlapping region in the frame of reference where no light points based on the captured reflections are collocated at the one or more given trajectory points; and determining, by the processing circuitry, the lens coverage condition based on a position of the vehicle in relation to the identified non-overlapping region.

2. A computer program product comprising program code for performing, when executed by the processing circuitry, the method of claim 1.

3. A non-transitory computer-readable storage medium comprising instructions, which when executed by the processing circuitry, cause the processing circuitry to perform the method of claim 1.

4. A computer system for determining a lens coverage condition of a light-based scanning device arranged in a vehicle, the computer system comprising processing circuitry configured to:

obtain light data from the light-based scanning device based on captured reflections of emitted light;

obtain trajectory data of an upcoming trajectory of the vehicle;

generate a frame of reference for the light-based scanning device by projecting a plurality of trajectory points, based on the trajectory data, onto a surface of a field of view of the light-based scanning device to obtain a common coordinate system, wherein, the frame of reference comprises a discrete map having a plurality of interconnected tiles being a tessellation of the field of view of the light-based scanning device, the light points and the trajectory points being contained in one or more of the interconnected tiles;

for one or more given trajectory points, identify a non-overlapping region in the frame of reference where no light points based on the captured reflections are collocated at the one or more given trajectory points; and determine the lens coverage condition based on a position of the vehicle in relation to the identified non-overlapping region.

5. The computer system of claim 4, wherein the non-overlapping region is identified by processing the tiles of the discrete map.

6. The computer system of claim 4, wherein the processing circuitry is further configured to determine the lens coverage condition by comparing a closest distance between the vehicle and the non-overlapping region in relation to a safety buffer distance defining a safe distance to a surface of a scanned environment required for a continued operation of the vehicle based on a current driving profile.

7. The computer system of claim 6, wherein the current driving profile depends on one or more of braking properties of the vehicle, a weight of the vehicle, a weight of currently loaded material on the vehicle, a current speed of the vehicle, and ambient conditions.

8. The computer system of claim 4, wherein in response to the lens coverage condition indicating that an external material is present on a lens of the light-based scanning device, the processing circuitry is further configured to control a removal of the external material.

9. The computer system of claim 8, wherein controlling the removal comprises automatically controlling a cleaning device of the vehicle to remove the external material present on the lens.

10. The computer system of claim 8, wherein controlling the removal comprises automatically controlling the vehicle to travel to a location where a subsequent removal of the external material present on the lens can be carried out.

11. The computer system of claim 4, wherein in response to the lens coverage condition indicating that a field of view of the lens of the light-based scanning device is at least partially covered, the processing circuitry is further configured to automatically control a braking system of the vehicle to cause a standstill of the vehicle.

12. The computer system of claim 11, wherein the processing circuitry is further configured to cancel control of the braking system after a cleaning procedure has been carried out.

13. The computer system of claim 4, wherein in response to the lens coverage condition indicating that a field of view of the lens of the light-based scanning device is at least partially covered, the processing circuitry is further configured to automatically control a braking system of the vehicle to cause a speed limitation of the vehicle.

14. The computer system of claim 4, wherein in response to the lens coverage condition indicating that a field of view of the lens of the light-based scanning device is at least partially covered, the processing circuitry is further configured to generate a warning signal.

15. The computer system of claim 4, wherein the lens coverage condition is determined as at least partially covered due to an external material being present on at least portions of a lens of the light-based scanning device, the external material being one or more of mud, dust, sand, water, ice, snow and bugs.

16. The computer system of claim 4, wherein the lens coverage condition is determined as at least partially covered due to hardware degradation of the light-based scanning device.

17. The computer system of claim 4, wherein the trajectory data is obtained from one or more of a route planning system, a road estimation system, and a predefined road network.

18. A vehicle comprising the computer system of claim 4.

* * * * *